US007920882B2

(12) United States Patent
Jung et al.

(10) Patent No.: US 7,920,882 B2
(45) Date of Patent: Apr. 5, 2011

(54) HUMAN INTERFACE DEVICE AND WIRELESS COMMUNICATION METHOD THEREOF

(75) Inventors: Jin-Woo Jung, Seongnam-si (KR);
 Bang-Won Lee, Yongin-si (KR);
 Young-Ho Shin, Yongin-si (KR);
 Chul-Yong Joung, Seoul (KR);
 You-Young Cha, Seoul (KR)

(73) Assignee: Atlab Inc. (KR)

( * ) Notice: Subject to any disclaimer, the term of this patent is extended or adjusted under 35 U.S.C. 154(b) by 1126 days.

(21) Appl. No.: 11/273,189

(22) Filed: Nov. 14, 2005

(65) Prior Publication Data
 US 2006/0105716 A1 May 18, 2006

(30) Foreign Application Priority Data

Nov. 12, 2004 (KR) .................. 10-2004-0092687

(51) Int. Cl.
 *H04B 7/00* (2006.01)
 *H04B 5/00* (2006.01)
 *H04B 1/38* (2006.01)
 *H04B 1/44* (2006.01)
 *H04W 36/00* (2009.01)
 *H04W 4/00* (2009.01)
 *H04L 5/22* (2006.01)
 *G06F 15/177* (2006.01)
 *G06F 3/00* (2006.01)
 *G06F 5/00* (2006.01)
 *G06F 13/12* (2006.01)
 *G06F 13/38* (2006.01)

(52) U.S. Cl. ........ 455/509; 455/41.1; 455/436; 455/519; 455/574; 370/282; 370/296; 370/331; 709/220; 710/9; 710/45; 710/72

(58) Field of Classification Search ................ 455/3.05, 455/41.2, 62, 63.1, 150.1, 151.1, 166.2, 179, 455/450, 452.2, 464, 462, 509, 554.2, 556.1, 455/557, 67.11, 2, 41.1–41.4, 3.03, 3.06, 455/67.1, 67.3, 142, 154.1, 436, 513, 516, 455/517, 519, 550.1, 574; 370/329, 331, 370/433, 468, 319, 373, 278, 280, 294, 313, 314, 321, 326, 336, 298, 282; 710/9, 19, 45, 58, 72, 124; 345/156, 169, 905; 709/220, 246
See application file for complete search history.

(56) References Cited

U.S. PATENT DOCUMENTS
5,878,276 A * 3/1999 Aebli et al. .................. 710/19
(Continued)

FOREIGN PATENT DOCUMENTS
CN 1393753 A 1/2003
(Continued)

OTHER PUBLICATIONS

Taiwan Office Action dated Feb. 16, 2009 for TW Application No. 094139577.
(Continued)

*Primary Examiner* — Andrew Wendell
*Assistant Examiner* — Paul P Tran
(74) *Attorney, Agent, or Firm* — Cantor Colburn LLP

(57) ABSTRACT

Provided are a human interface device and a wireless communication method thereof. The wireless communication method of the human interface includes the steps of: setting up an occupancy channel of the host digital terminal and the wireless input unit by communicating data for setting up the occupancy channel through the emergency channel; transmitting, at the wireless input unit, operation data through the occupancy channel, and receiving, at the host digital terminal, the operation data; and when the operation data is not generated until a predetermined time lapses, enabling the wireless input unit and the host digital terminal to operate in an operation standby state, and confirming whether there is interference on the occupancy channel. Accordingly, efficiency of a frequency band is increased, and cost and size of the product can be reduced. Further, when interference on the occupancy channel is detected, a new occupancy channel can be set up so that reliability and efficiency of the wireless communication can be increased.

40 Claims, 8 Drawing Sheets

U.S. PATENT DOCUMENTS

| | | | |
|---|---|---|---|
| 6,931,026 B1 * | 8/2005 | Lee et al. | 370/468 |
| 7,310,498 B2 * | 12/2007 | Henry et al. | 455/41.2 |
| 2003/0181211 A1 * | 9/2003 | Razavilar et al. | 455/450 |
| 2004/0146022 A1 * | 7/2004 | Lewis et al. | 370/331 |
| 2004/0177132 A1 * | 9/2004 | Zhang et al. | 709/220 |
| 2004/0205361 A1 * | 10/2004 | Wortel et al. | 713/300 |
| 2005/0059437 A1 * | 3/2005 | Son et al. | 455/574 |
| 2005/0136958 A1 * | 6/2005 | Seshadri et al. | 455/519 |
| 2006/0067354 A1 * | 3/2006 | Waltho et al. | 370/433 |

FOREIGN PATENT DOCUMENTS

| | | |
|---|---|---|
| TW | 487204 | 5/2002 |

OTHER PUBLICATIONS

English Translation of Taiwan Office Action dated Feb. 16, 2009 for TW Application No. 094139577.

\* cited by examiner

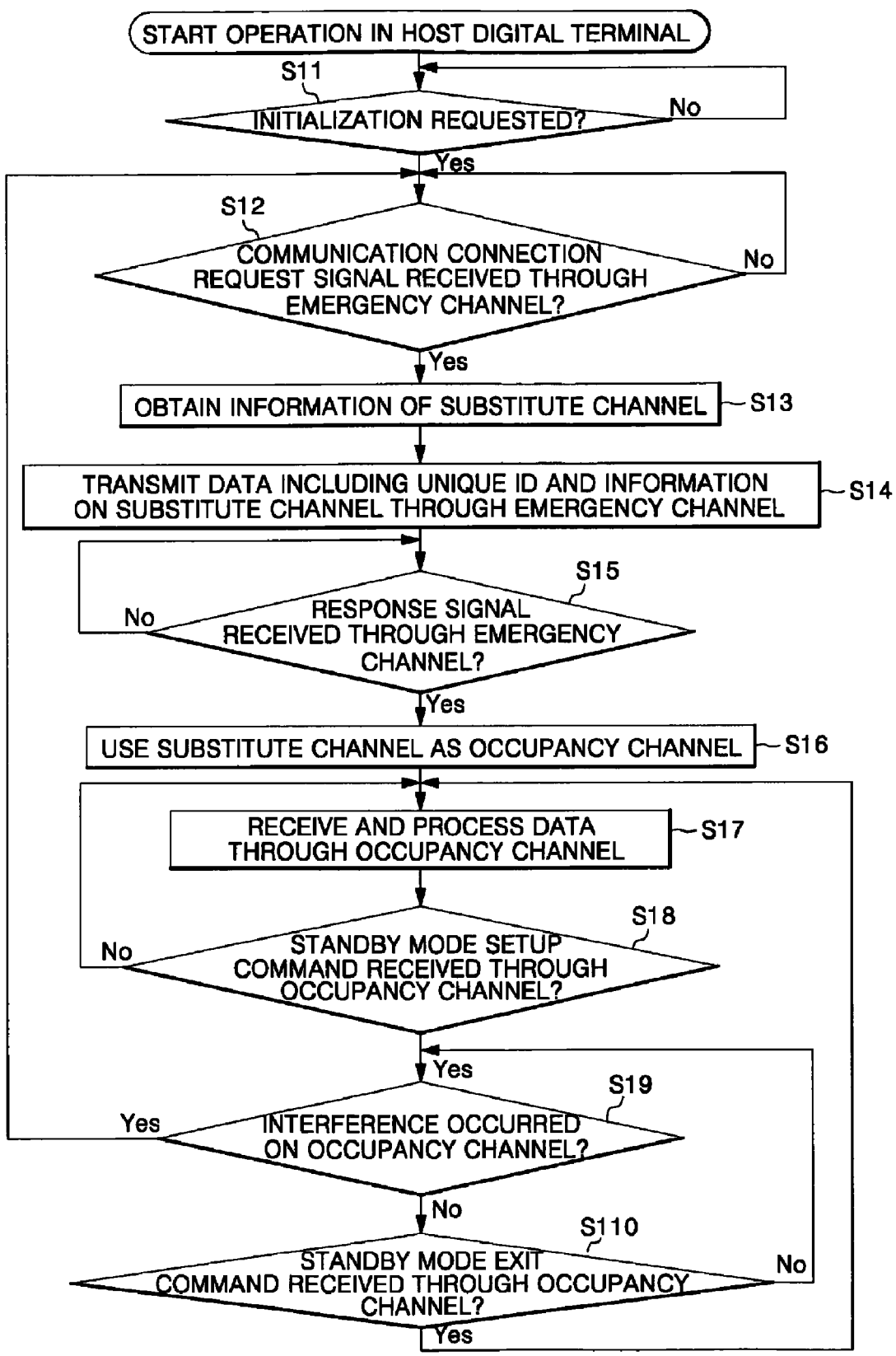

HUMAN INTERFACE DEVICE AND WIRELESS COMMUNICATION METHOD THEREOF

CROSS-REFERENCE TO RELATED APPLICATION

This application claims the benefit of Korean Patent Application No. 2004-92687, filed Nov. 12, 2004, the contents of which are hereby incorporated herein by reference in their entirety.

BACKGROUND OF THE INVENTION

1. Field of the Invention

The present invention relates to a human interface device, and more particularly, to a human interface device using a time divisional two-way communication method, and a wireless communication method thereof.

2. Description of Related Art

A human interface device refers to anything that serves as an interface between a human and a computer or peripheral device such as a keyboard, a mouse, a wireless sensor, a mobile phone, a notebook computer, a digital camera, etc.

Human interface devices are gradually adopting wireless communication technology in order to maximize user convenience. Such a human interface device is comprised of a wireless input unit 2 performing an operation based on a user's request and generating operation data, and a host digital terminal 1 connected to a computer 3 via cable and to the wireless input unit 2 wirelessly, for interfacing between the computer 3 and the wireless input unit 2.

The host digital terminal 1 establishes an occupancy channel and an emergency channel to wirelessly communicate with the wireless input unit 2, receives data from the wireless input unit 2 through the occupancy channel in normal operation, converts the received data into a format recognized by the computer 3, and provides the converted data to the computer 3. Further, when there is interference such as cross-talk or noise on the occupancy channel, the host digital terminal 1 detects the interference and provides the wireless input unit 2 with data to establish a new occupancy channel, through the emergency channel.

The wireless input unit 2 establishes an occupancy channel and an emergency channel to wirelessly communicate with the host digital terminal 1, performs an operation based on the user's request in normal operation, and upon occurrence of operation data, transmits the operation data to the host digital terminal 1 over the occupancy channel. Further, when there is interference such as cross-talk or noise on the occupancy channel, the wireless input unit 2 receives data to establish a new occupancy channel, through the emergency channel, and establishes a new occupancy channel accordingly.

FIG. 2 is a diagram illustrating channels for performing wireless communication in a conventional human interface device.

Referring to FIG. 2, the conventional human interface device employing a frequency division scheme includes a plurality of channels CH1-CHN which use different frequency bands, including a transmission channel TX CH and a reception channel RX CH per a channel.

Further, one channel CH1 of the plurality of channels CH1-CHN is used as an emergency channel for communicating data to establish a new occupancy channel, and another channel CH3, for example, is used as an occupancy channel to communicate operation data.

In normal operation, the wireless input unit 2 transmits operation data generated as a result of an operation to the host digital terminal 1 through the transmission channel TX CH of the occupancy channel CH3, and the host digital terminal 1 receives the operation data of the wireless input unit 2 through the transmission channel RX CH of the occupancy channel CH3.

However, a main operation of the human interface device is to transmit data from the wireless input unit 2 to the host digital terminal 1. Accordingly, while the transmission channel TX CH of the occupancy channel CH3 is mainly used, the reception channel RX CH of the occupancy channel CH3 is rarely used, so that a frequency bandwidth corresponding to the reception channel RX CH of the occupancy CH3 channel is wasted.

Further, in order for the host digital terminal 1 and the wireless input unit 2 to communicate wirelessly, they should be able to simultaneously recognize different frequency bands corresponding to the transmission channel TX CH and reception channel RX CH, respectively.

So, the host digital terminal 1 and the wireless input unit 2 have to further include a duplexer unit for separating and selecting frequency bands of the transmission and reception channels through a band pass filtering operation, and separately include a unit for modulating data on the transmission channel and a unit for demodulating data on the reception channel.

As such, since the conventional human interface device employs the frequency division scheme, there is a problem in that it has to include a duplexer unit, a unit for modulating data on the transmission channel, and a unit for demodulating data on the reception channel, while wasting frequency bandwidth, and thus production cost and product size increase.

SUMMARY OF THE INVENTION

It is, therefore, an objective of the present invention to provide a human interface device and wireless communication method thereof capable of more efficiently utilizing a frequency band by using a time divisional two-way communication method.

It is another objective of the present invention to provide a human interface device and wireless communication method thereof capable of reducing production cost and product size.

According to an aspect of the present invention, a wireless input unit for communicating data with a host digital terminal includes at least one emergency channel, one occupancy channel, and at least one unoccupied channel, and transmission and reception channels of each channel use the same frequency band, wherein when there is no interference on the occupancy channel, the wireless input unit communicates data with the host digital terminal through the occupancy channel, and when there is interference on the occupancy channel, the wireless input unit communicates data with the host digital terminal through the emergency channel so as to newly set up the occupancy channel.

According to another aspect of the present invention, a host digital terminal wirelessly connected to a wireless input unit and connected via cable to a computer, for interfacing between the wireless input unit and the computer, includes at least one emergency channel, one occupancy channel, and at least one unoccupied channel, and transmission and reception channels of each channel use the same frequency band, wherein when there is no interference on the occupancy channel, the host digital terminal communicates data through the occupancy channel, and when there is interference on the occupancy channel, the host digital terminal obtains a substitute channel from among unoccupied channels, generates data including substitute channel information to set up a new occupancy channel, and communicates the data through the emergency channel.

According to still another aspect of the present invention, a wireless communication method in a wireless input unit including at least one emergency channel, one occupancy channel, and at least one unoccupied channel, includes the steps of: a) when receiving data to set up the occupancy channel through the emergency channel, analyzing the data to set up the occupancy channel, obtaining a substitute channel, and setting up the substitute channel as a new occupancy channel; b) transmitting operation data generated by an internal operation of the wireless input unit through the occupancy channel; c) when the operation data is not generated before a predetermined time lapses, confirming whether there is interference on the occupancy channel and then enabling the wireless input unit to operate in a standby state when there is no interference on the occupancy channel, and enabling the wireless input unit to enter into the channel setup step when there is interference on the occupancy channel; and d) when the operation data is generated in the standby state, confirming whether there is interference on the occupancy channel, enabling the wireless input unit to enter into step b) when there is no interference on the occupancy channel, and enabling the wireless input unit to enter into step a) when there is interference on the occupancy channel.

According to yet another aspect of the present invention, a wireless communication method in a host digital terminal including at least one emergency channel, one occupancy channel, and at least one unoccupied channel, includes the steps of: a) scanning the one occupancy channel and the at least one unoccupied channel and obtaining a substitute channel, setting up the substitute channel as a new occupancy channel, generating data including information on the substitute channel to set up the occupancy channel, and transmitting the data on the emergency channel; b) when receiving operation data of the wireless input unit through the set occupancy channel, converting the operation data into a format recognized by a computer, and transmitting the converted data to the computer; c) when informed that the wireless input unit enters into an operation standby state through the set occupancy channel, enabling the wireless input unit to enter into the operation standby state and intermittently confirming whether there is interference on the occupancy channel, maintaining the operation standby state when there is no interference on the occupancy channel, and enabling the wireless input unit to enter into the step b) when there is interference on the occupancy channel; and d) when informed that the wireless input unit exits the operation standby state through the set occupancy channel in the operation standby state, confirming whether there is interference on the occupancy channel, enabling the wireless input unit to enter into the step b) when there is no interference on the occupancy channel, and enabling the wireless input unit to enter into the step a) when there is interference on the occupancy channel.

According to yet another aspect of the present invention, a wireless communication method in a human interface apparatus having a host digital terminal and a wireless input unit including at least one emergency channel, one occupancy channel, and at least one unoccupied channel, includes the steps of: a) setting up an occupancy channel of the host digital terminal and the wireless input unit by transmitting and receiving data for setting up the occupancy channel through the emergency channel; b) transmitting, at the wireless input unit, operation data through the occupancy channel, and receiving, at the host digital terminal, the operation data; and c) when the operation data is not generated until a predetermined time lapses, enabling the wireless input unit and the host digital terminal to operate in an operation standby state, and confirming whether there is interference on the occupancy channel.

BRIEF DESCRIPTION OF THE DRAWINGS

The foregoing and other objects, features and advantages of the invention will be apparent from the more particular description of an exemplary embodiment of the invention, as illustrated in the accompanying drawing. The drawing is not necessarily to scale, emphasis instead being placed upon illustrating the principles of the invention.

FIG. 5A is a diagram illustrating a wireless communication method of a host digital terminal of a human interface device according to a first exemplary embodiment of the present invention.

DETAILED DESCRIPTION OF EXEMPLARY EMBODIMENTS

Hereinafter, a human interface device and wireless communication method thereof according to the present invention will be described with reference to accompanying drawings.

Figure 3:
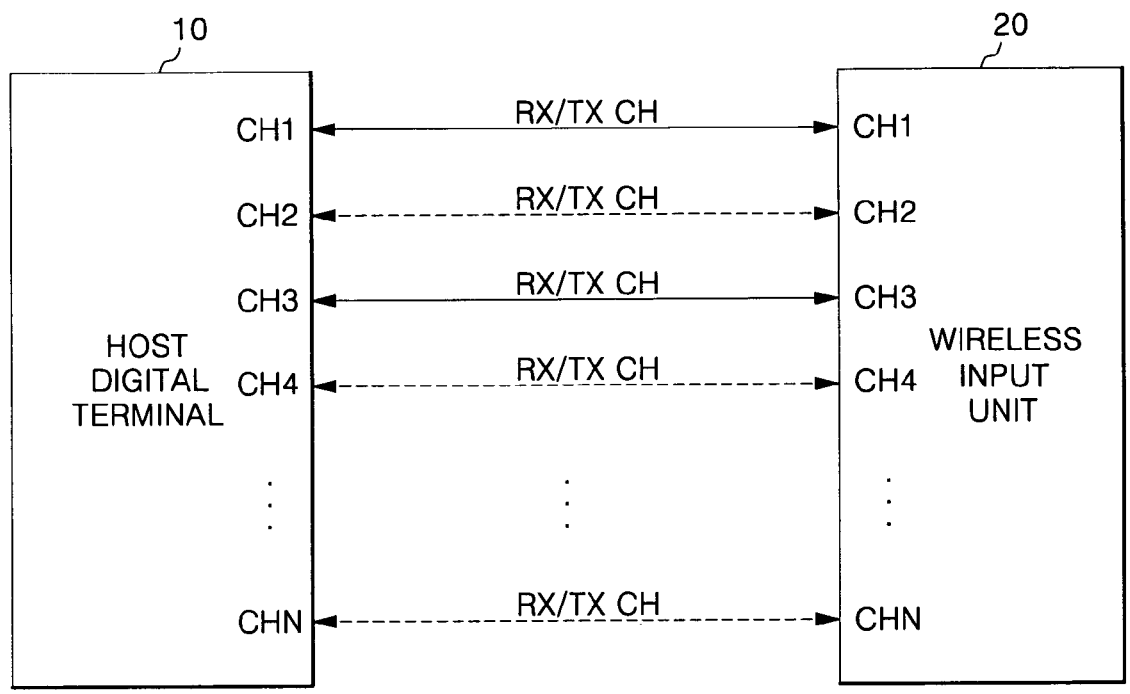
FIG. 3 is a diagram illustrating wireless communication channels of a human interface device according to the present invention.

FIG. 3 is a diagram illustrating wireless communication channels of a human interface device according to the present invention, wherein reference numerals 10 and 20 denote a host digital unit and a wireless input unit, respectively.

As shown in the figure, the human interface device of the present invention employs a time divisional scheme and includes a plurality of channels CH1-CHN in which a frequency band is commonly used as transmission and reception channels. Assume that one channel CH1, for example, is used as an emergency channel and another channel CH3, for example, is used as an occupancy channel.

The occupancy channel CH3 is used to communicate data between the host digital terminal 10 and the wireless input unit 20 in normal operation.

The emergency channel CH1 is used to transmit and receive information on a new occupancy channel when it is needed to establish a channel initially and to establish a new occupancy channel when there is interference on the current occupancy channel. The emergency channel CH1 is a communication channel between the host digital terminal 10 and the wireless input unit 20 that is agreed to be used as described above and can be changed at need.

Figure 1:
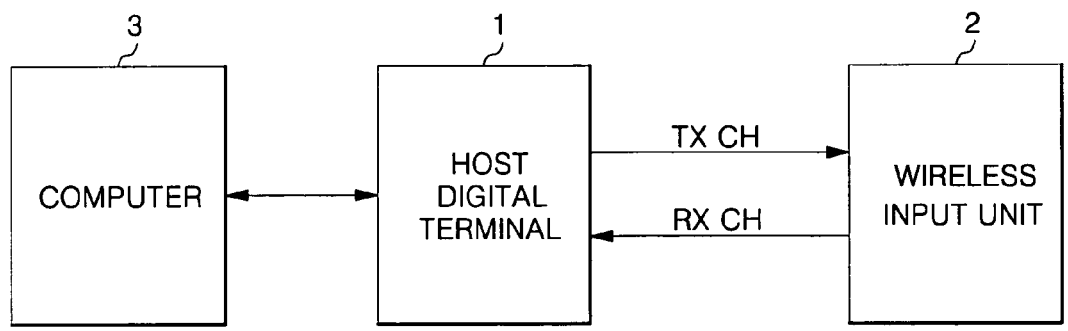
FIG. 1 is a diagram illustrating the configuration of a conventional wireless human interface device.
Figure 2:
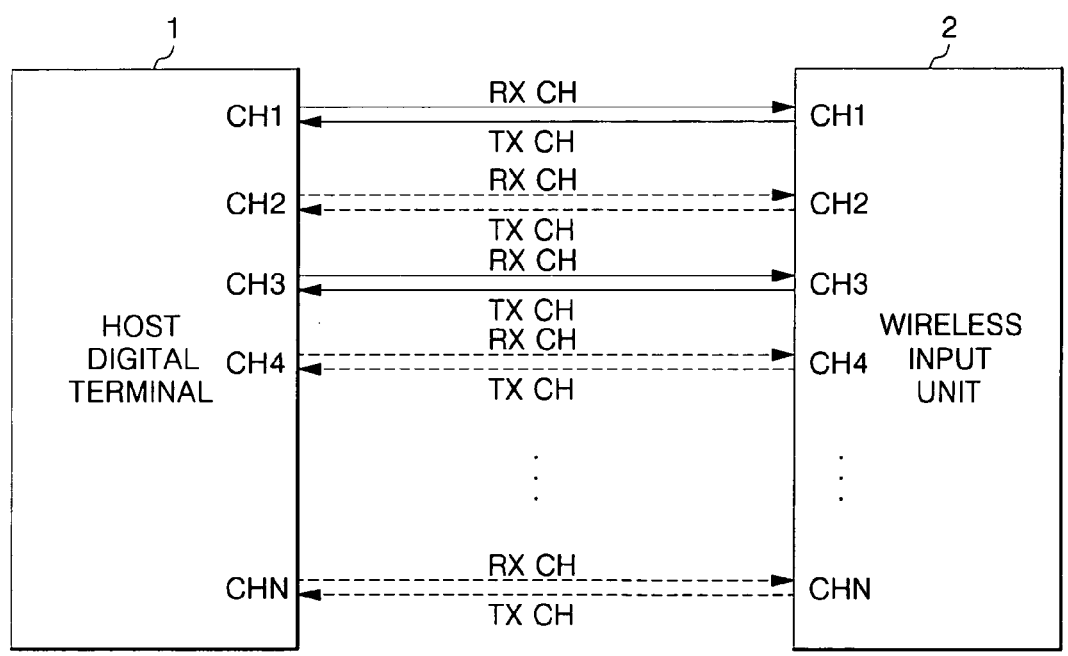
FIG. 2 is a diagram illustrating wireless communication channels of the human interface device shown in FIG. 1.

Since the channels in FIG. 3 communicate data between the host digital terminal 10 and the wireless input unit 20 using one frequency band, unlike the channels of FIG. 2, only about half as much frequency bandwidth is required compared with the channels of FIG. 2. Accordingly, the channels of FIG. 3 make more efficient use of frequency bandwidth.

Figure 4:
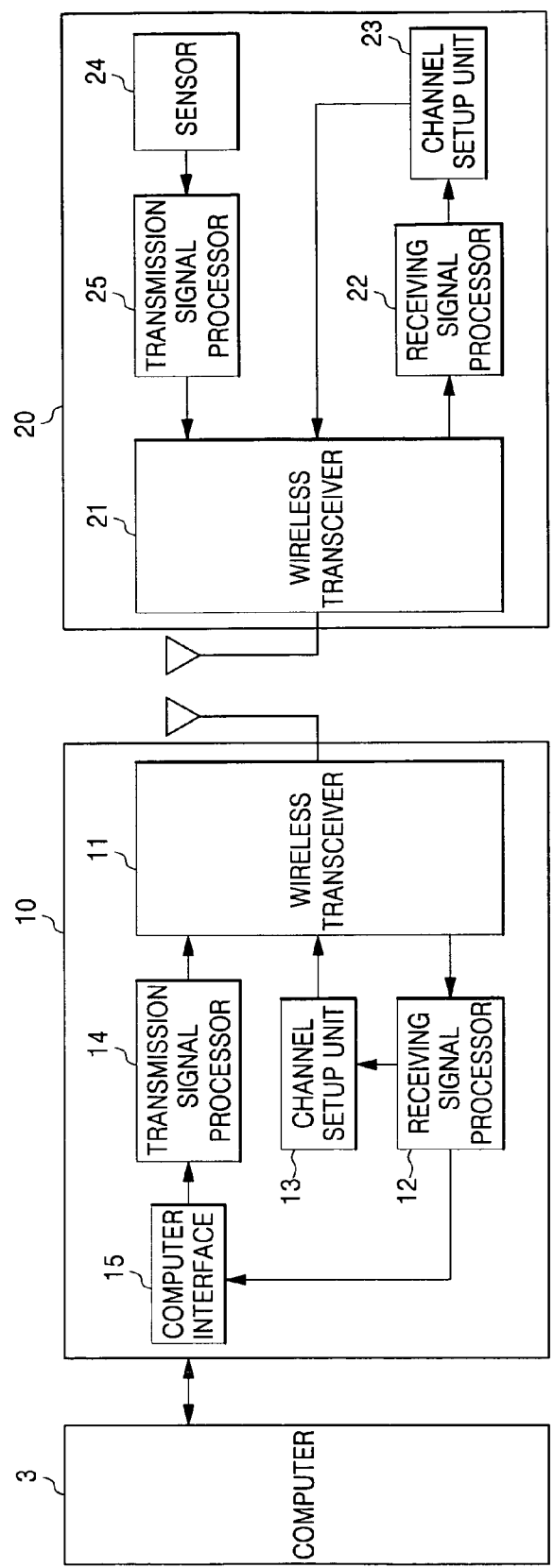
FIG. 4 is a diagram illustrating an internal configuration of a human interface device using the channels of FIG. 3.

FIG. 4 is a diagram illustrating an internal configuration of a human interface device using the channels of FIG. 3.

As shown in the figure, the host digital terminal 10 of the human interface device of the present invention includes a wireless transceiver 11, a reception signal processor 12, a channel setup unit 13, a transmission signal processor 14, and a computer interface 15. And, the wireless input unit 20 includes a wireless transceiver 21, a reception signal processor 22, a channel setup unit 23, a sensor 24, and a transmission signal processor 25.

Functions of each element of the host digital terminal 10 will be described below.

The wireless transceiver 11 moves to the emergency channel and communicates data in a channel setup mode, and moves to the occupancy channel and communicates data in operation active mode and standby mode. Further, the wireless transceiver 11 demodulates the data received through the occupancy or the emergency channel and transmits it to the receiving data processor 15, and modulates the data transmitted from the transmitting data processor 14 or the channel setup unit 13 and transmits it through the occupancy channel.

The receiving signal processor 12 receives transmission information including a unique ID of the wireless input unit 20 and data format information based on a transmission protocol to the wireless input unit 20, decodes the data transmitted from the wireless transceiver 11 according to the transmission information, and performs a task corresponding to the decoded data.

In more detail, when the received data is operational data of the wireless input unit 20, the receiving signal processor 12 confirms that the wireless input unit 20 works normally, operates in the operation active mode, and transmits the operation data of the wireless input unit 20 to the computer interface 15. When the received data are a standby mode setup command, the receiving signal processor 12 confirms that the wireless input unit 20 is operating in the standby mode, and enters into the standby mode. Further, when the received data are a standby mode exit command, the receiving signal processor 12 confirms that the wireless input unit 20 exits the standby mode and enters into the operation active mode again.

Preferably, the receiving signal processor 12 confirms whether or not channels are interfered in a predetermined time interval in the standby mode. When erroneous data is received more than a predetermined number n through the occupancy channel, the receiving signal processor 12 confirms that currently occupied channels are interfered, and enters into the channel setup mode.

Here, the erroneous data is data having transmission data different from the transmission data included in the receiving signal processor 12 or any type of data that the host digital terminal 10 cannot recognize, that is, any type of data that can result from interfering of occupancy channels.

When the channel setup unit 13 receives a communication connection signal from the wireless input unit 20 in the channel setup mode, it scans a plurality of channels, finds all unoccupied channels, and then selects a substitute channel. Also, the channel setup unit 13 generates channel control data including the selected substitute channel information and a unique ID and then outputs it to the wireless transceiver 11.

Further, when the channel setup unit 13 is notified that the wireless input unit 20 successfully received the channel control data, it resets the substitute channel as a new occupancy channel.

In here, when obtaining the substitute channel, the channel setup unit 13 can periodically or intermittently scan the plurality of channels in advance and then obtain the substitute channel.

Further, the channel setup unit 13 resets the occupancy channel when the host digital terminal 10 is newly powered and initialized, or is requested to set up the occupancy channel.

The transmission signal processor 14 includes transmission information including a unique ID of the wireless input unit 20 and data format information based on a transmission protocol to the wireless input unit 20. Also, when the transmission signal processor 14 receives data from the computer interface 15, it encodes the data according to the transmission information and then outputs it to the wireless transceiver 11.

The computer interface 15 physically connects to the computer 3. Also, when the computer interface 15 receives operation data of the wireless input unit 20 from the receiving signal processor 12, it converts the data into a format recognized by the computer 3 and outputs it to the computer 3.

Further, the host digital terminal 10 further includes a display unit (not shown), so that when the occupancy channel set up by the channel setup unit 13 fails, the host digital terminal 10 informs a user of the failure.

Of course, it is unique that the host digital terminal 10 can inform the computer 3 that the occupancy channel set up by the channel setup unit 13 has failed and revised, according to a user's need.

A function of each block of the wireless input unit 20 will be described as follows.

The wireless transceiver 21 demodulates data received through the occupancy or emergency channel and transmits it to the receiving data processor 22. Also, the wireless transceiver 21 modulates data transmitted from the transmitting data processor 25 or the channel setup unit 23 and then transmits it through the occupancy or emergency channel.

In the channel setup mode, the wireless transceiver 21 moves to the emergency channel, and transmits and receives data through the emergency channel. Also, in the operation active mode and standby mode, the wireless transceiver 21 moves to the occupancy channel, and communicates data through the occupancy channel. Further, the wireless transceiver 21 demodulates data received through the occupancy or emergency channel and then transmits it to the data processor 22, and modulates the data transmitted from the transmitting data processor 25 and then transmits it through the emergency channel.

The receiving signal processor 22 receives transmission information consisted of a unique ID of the wireless input unit 20 and data format information based on a transmission protocol to the host digital terminal 10, decodes data transmitted from the wireless transceiver 11 according to transmission information, and performs tasks based on the decoded data.

In more detail, when the receiving signal processor 22 receives erroneous data more than a predetermined number n, it confirms that there is interference in a current occupancy channel and enters into the channel setup mode. And, when the receiving signal processor 22 receives the channel setup data in the channel setup mode, it transmits the channel setup data to the channel setup unit 23.

When the channel setup mode is established, the channel setup unit 23 generates a communication connect signal to set up the occupancy channel and then transmits the signal through the emergency channel. Further, when the channel setup data is transmitted from the host digital terminal 10, the host digital terminal 10 is informed that the channel setup data was successfully received, information on the substitute channel is obtained from channel control data, and the obtained substitute channel is set up as a new occupancy channel.

The sensor 24 performs an operation based on a user's request, generates operation data responding a result of the operation, and then transmits the data to the transmission signal processor 25. Here, the sensor can be buttons or navigation sensor of mouse and joystick.

The transmission signal processor 25 includes transmission information including a unique ID of the wireless input unit 20 and data format information according to the transmission protocol to the host digital terminal 10, sets up an operation mode of the wireless input unit 20 depending on an operation state of the sensor 24, and performs a task depending on the operation mode.

In more detail, when the sensor 24 generates operation data, the transmission signal processor sets up an operation active mode to transmit the operation data to the host digital terminal 10. Also, when the sensor 24 does not generate the operation data until a predetermined time lapses, the wireless input unit enters into the standby mode, and when the sensor 24 generates the operation data again, it re-enters into the operation active mode.

In the operation active mode, the transmission signal processor 25 encodes the operation data of the sensor 24 according to the transmission information and outputs it to the wireless transceiver 21. Also, when the wireless input unit enters into the standby mode from the operation active mode or into the operation active mode from the standby mode, the transmission signal processor 25 confirms whether there is interference on the occupancy channel, by operating the wireless input unit in a reception mode through the occupancy channel. In the standby mode, the transmission signal processor 25 operates the wireless input unit in the power-down state.

Further, the wireless input unit 20 further comprises a display unit (not shown), and when the occupancy channel set up fails, the transmission signal processor 25 informs a user of the failure using the display unit.

Figure 5B:
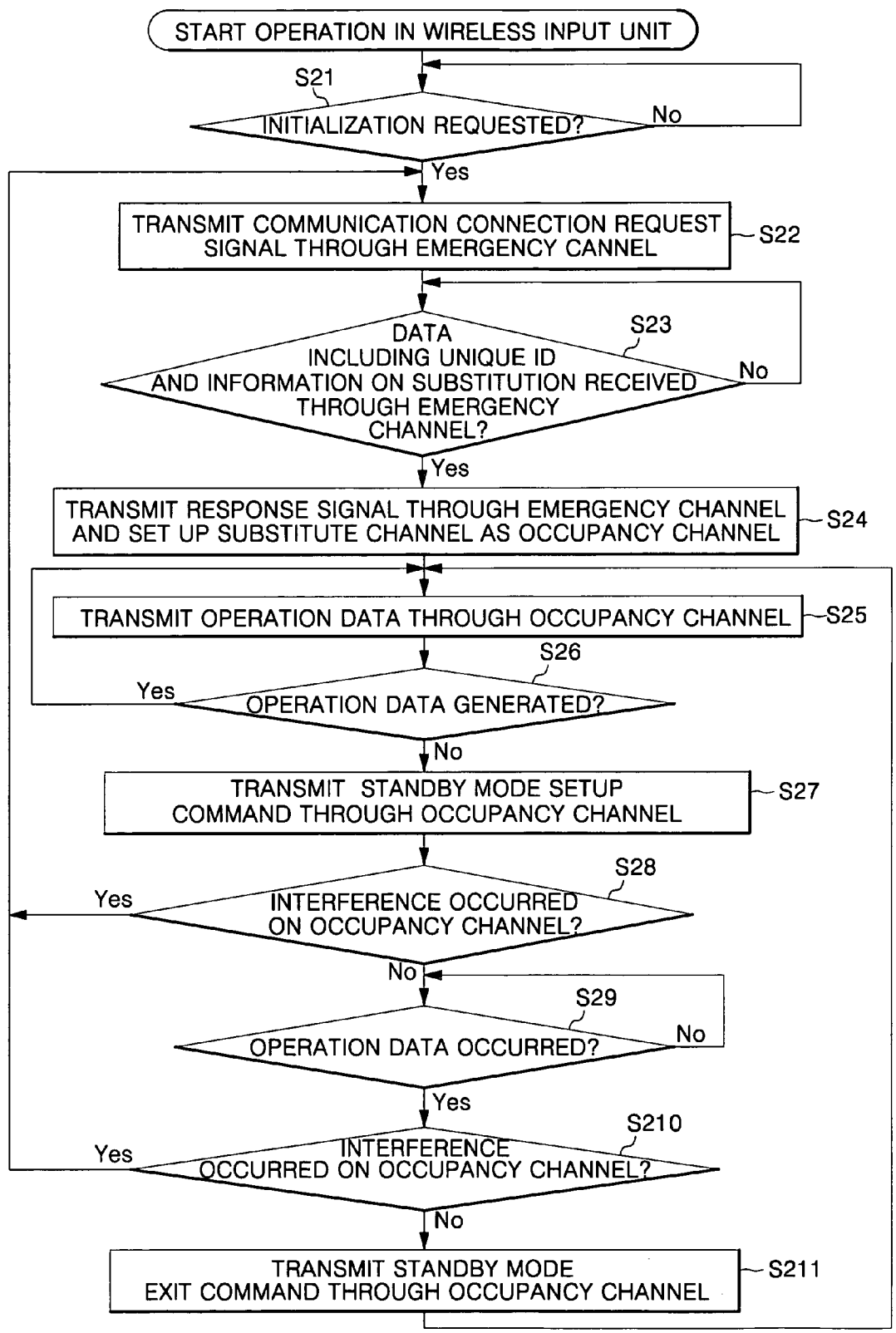
FIG. 5B is a diagram illustrating a wireless communication method of a wireless input unit of a human interface device according to a first exemplary embodiment of the present invention.

Communication methods of the host digital terminal and the wireless input unit using the channels shown in FIG. 3 will be described below with reference to FIGS. 5A and 5B.

The human interface sets up one of the channels shown in FIG. 3 in advance as an emergency channel to communicate the data used to set up a channel before performing wireless communication again, and another channel as an occupancy channel to transmit and receive data generated in normal operation whenever wireless communication is performed again.

First, a communication method of the host digital terminal will be described with reference to FIG. 5A.

When the human interface is newly installed and an initialization operation is requested (S11), the host digital terminal 10 changes the operation active mode to the channel setup mode, and moves to the emergency channel. Further, it is confirmed that the communication connection request signal of the wireless input unit 20 is received by switching the emergency channel to the reception mode (S12).

As a result of confirmation in step S12, when the communication connection request signal is received through the emergency channel, channels that are not currently occupied are recognized and one of the recognized channels is obtained as a substitute channel (S13).

The host digital terminal 10 generates channel control data including substitute channel information and a unique ID of the wireless input unit 20, operates the emergency channel in the transmission mode, and transmits the generated channel control data through the emergency channel (S14).

Further, by operating the emergency channel in the reception mode, it is confirmed that the response signal to the channel control data is received through the emergency channel (S15).

As a result of the confirmation in step S15, when the response signal for the channel control data is received, the substitute channel obtained through step S13 is set up as a new occupancy channel. Further, the wireless input unit enters into the operation active mode and moves from the emergency channel to the occupancy channel (S16).

The host digital terminal 10 that has entered into the operation active mode obtains data transmitted from the wireless input unit 20 by operating the occupancy channel in the reception mode, and analyzes the obtained data (S17).

As a result of the analysis in step S17, when the obtained data are standby mode setup command (S18), the host digital terminal 10 enters into the standby mode and confirms whether there is interference on the occupancy channel by operating the occupancy channel in the reception mode intermittently (S19).

On the other hand, as a result of the analysis in step S18, when the obtained data is operation data of the wireless input unit 20, it is converted into a format recognized by the computer 3 and transmitted to the computer 3. Then, the process goes back to step S17 in order to receive new operation data.

In step S19, both the host digital terminal 10 and the wireless input unit 20 operate in the standby mode and do not transmit data through the occupancy channel. So, the host digital terminal 10 should not be able to receive any data through the occupancy channel. However, when there is interference on the occupancy channel due to another wireless input unit or other wireless devices, the host digital terminal 10 receives erroneous data through the occupancy channel.

Therefore, when the host digital terminal 10 receives the erroneous data through the occupancy channel in the standby mode, it is determined that there is interference on the occupancy channel.

As a result of confirmation in step S19, when there is interference on the occupancy channel due to other wireless devices, the host digital terminal 10 progresses to step S12 in order to set up a new occupancy channel. Also, when there is no interference on the occupancy channel, it is confirmed whether the host digital terminal 10 receives the standby mode exit command (S110).

As a result of the confirmation in step S110, when the standby mode exit command is not received, the standby mode is maintained and the process goes back to step S19. Also, when the standby mode exit command is received, the host digital terminal 10 exits the standby mode and the process goes back to step S17 so that the host digital terminal 10 receives the operation data of the wireless input unit 20.

A communication method of the wireless input unit will now be described with reference to FIG. 5B.

When the human interface is newly installed and an initialization operation is requested (S21), the wireless input unit 20 enters into the channel setup mode and moves to the emergency channel. Further, the wireless input unit 20 generates the communication connection request signal, and uses the emergency channel in the transmission mode so as to transmit the generated communication connection request signal (S22).

When transmission of the communication connection request signal is completed, it is confirmed by operating the emergency channel in the reception mode whether the channel control data including the substitute channel information transmitted from the host digital terminal 10 and the unique ID of the wireless input unit 20 is received (S23).

As a result of the confirmation in step S23, when the channel control data is received, a response signal to inform the host digital terminal 10 that the channel control data was successfully received is generated, and the generated response signal is transmitted by using the emergency channel in the transmission mode. Further, the substitute channel is obtained by analyzing the obtained channel control data, and the substitute channel is set up as a new occupancy channel (S24).

When the occupancy channel setup is completed, the wireless input unit 20 enters into the operation active mode and moves from the emergency channel to the occupancy channel. Further, by operating the occupancy channel in the transmission mode, the operation data generated by internal operation of the wireless input unit 20 is transmitted (S25).

When the operation data of the wireless input unit 20 is not generated until a predetermined time lapses, the wireless input unit 20 enters into the standby mode (S26), and the standby mode setup command to inform the host digital terminal 10 are generated and transmitted to the occupancy channel (S27).

Further, the wireless input unit 20 confirms by operating the occupancy channel in the reception mode whether there is interference on the occupancy channel (S28).

As a result of the confirmation in step S28, when there is interference on the occupancy channel due to other wireless devices, the wireless input unit 20 goes back to step S22 in order to set up a new occupancy channel. Also, when there is no interference on the occupancy channel, the wireless input unit confirms whether operation data of the wireless input unit 20 is generated while maintaining a standby state (S29).

As a result of the confirmation in step S29, when the operation data is generated, the wireless input unit 20 confirms once again whether there is interference on the occupancy channel, by operating the occupancy channel in the reception mode (S210).

As a result of the confirmation in step S210, when there is interference on the occupancy channel due to another wireless unit, the wireless input unit 20 goes back to step S22 in order to set up a new occupancy channel.

On the other hand, as a result of the confirmation in step S210, when there is no interference on the occupancy channel, the standby mode exit command is generated and transmitted on the occupancy channel (S211), and the process goes to step S25 in order to transmit the operation data on the occupancy channel.

Below, a wireless communication method of the human interface including the host digital terminal and the wireless input unit performing the wireless communication methods shown in FIGS. 5A and 5B will be described with reference to FIG. 6.

First, when the human interface is newly installed or there is interference in the current occupancy channel, the host digital terminal 10 and the wireless input unit 20 each enter into a channel setup mode.

The wireless input unit 20 that has entered into the channel setup mode generates a communication connection request signal to request a communication connection, and transmits the generated communication connection request signal by using the emergency channel in the transmission mode (S31). Further, the wireless input unit 20 operates the emergency channel in the reception mode again when transmission of the communication connection request is completed.

When the host digital terminal 10 receives the communication connection request signal from the wireless input unit 20, it searches a plurality of channels except the emergency channel in the reception mode, and recognizes a channel which is not occupied by other wireless devices, that is, a substitute channel. Further, the host digital terminal 10 generates channel control data including the substitute channel information, and transmits the generated channel control data by operating the emergency channel in the transmission mode (S32).

Further, when transmission of the channel control data is completed, the host digital terminal 10 uses the emergency channel in the reception mode again.

When the wireless input unit 20 receives the channel control data through the emergency channel, it uses the emergency channel in the transmission mode and transmits the generated response signal. Further, the wireless input unit 20 obtains information on the substitute channel from the channel control data, and sets up the obtained substitute channel as a new occupancy channel (S33).

Further, the wireless input unit 20 enters into an operation active mode when the occupancy channel setup is completed. Also, when the host digital terminal 10 receives the response signal through the emergency channel, it sets up the substitute channel obtained in step S32 as a new occupancy channel and enters into the operation active mode.

When the operation data is generated, the wireless input unit 20 transmits the generated operation data to the host digital terminal 10 by using the occupancy channel in the transmission mode. Also, the host digital terminal 10 receives the operation data transmitted from the wireless input unit 20 by using the occupancy channel in the reception mode (S34).

Further, when the operation data is not generated until a predetermined time lapses, the wireless input unit 20 enters into the standby mode, generates the standby mode setup command and informs the host digital terminal 10. Also, the host digital terminal 10 which has received the standby mode setup command enters into the standby mode (S35).

The wireless input unit 20 which has entered into the standby mode confirms whether there is interference on the occupancy channel by using the occupancy channel in the reception mode once (S36). And, when there is no interference on the occupancy channel, the wireless input unit 20 operates in the standby state. Also, the host digital terminal 10 intermittently operates the occupancy channel in the reception mode and intermittently confirms whether there is interference on the occupancy channel (S37). Here, in the power-down state in FIGS. 6, 7, 8 within the standby mode, other blocks except necessary blocks used to check existence of the interference are in a power-save mode.

When operating in the standby mode, the wireless input unit 20 detect that the operation data is generated again and confirms whether there is interference on the occupancy channel by operating the occupancy cannel in the reception mode once (S38). When there is no interference on the occupancy channel, the wireless input unit 20 generates the standby mode exit command and transmits it on the occupancy channel (S39). So, the wireless input unit 20 that has completed transmission of the standby mode exit command, and the host digital terminal 10 that has received the standby mode exit command, enter into the operation active mode again.

On the other hand, when the host digital terminal 10 or the wireless input unit 20 detects interference on the occupancy channel in step S36, the host digital terminal 10 or the wireless input unit 20 enters into the channel setup mode again in order to set up a new occupancy channel.

As such, the human interface and communication method according to the present invention employ a time divisional scheme so that a frequency bandwidth needed for data communication between the host digital terminal 10 and the wireless input unit 20 is remarkably reduced and the occupancy channel can also be revised even when interference is detected on the occupancy channel.

Further, in the operation active mode, the host digital terminal 10 uses the occupancy channel only in the reception mode, and the wireless input unit 20 uses the occupancy channel only in the transmission mode, so that efficiency of the communication channel can be further increased.

Figure 7:
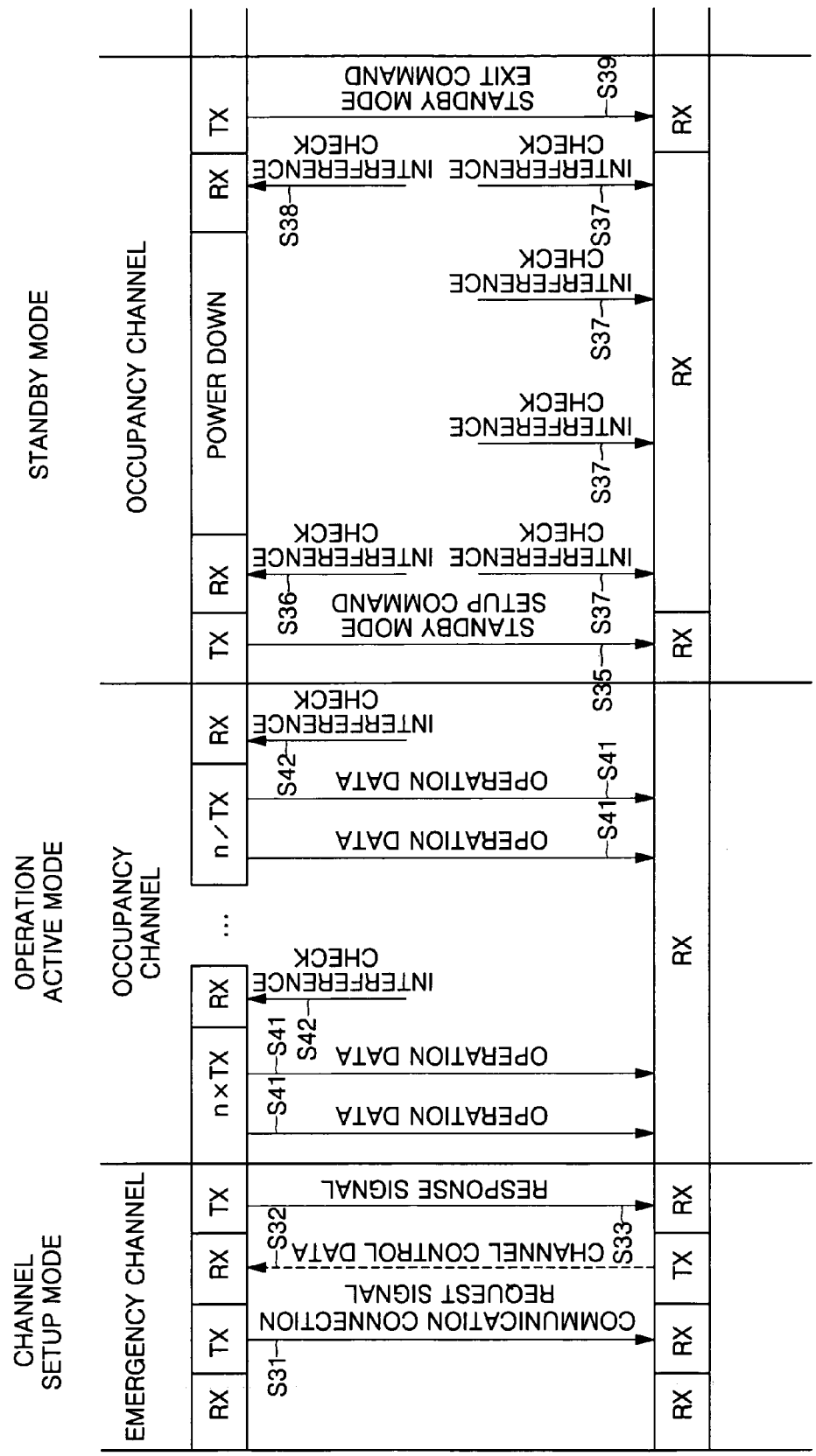
FIG. 7 is a diagram illustrating a wireless communication method of a human interface device according to a second exemplary embodiment of the present invention.
Figure 8:
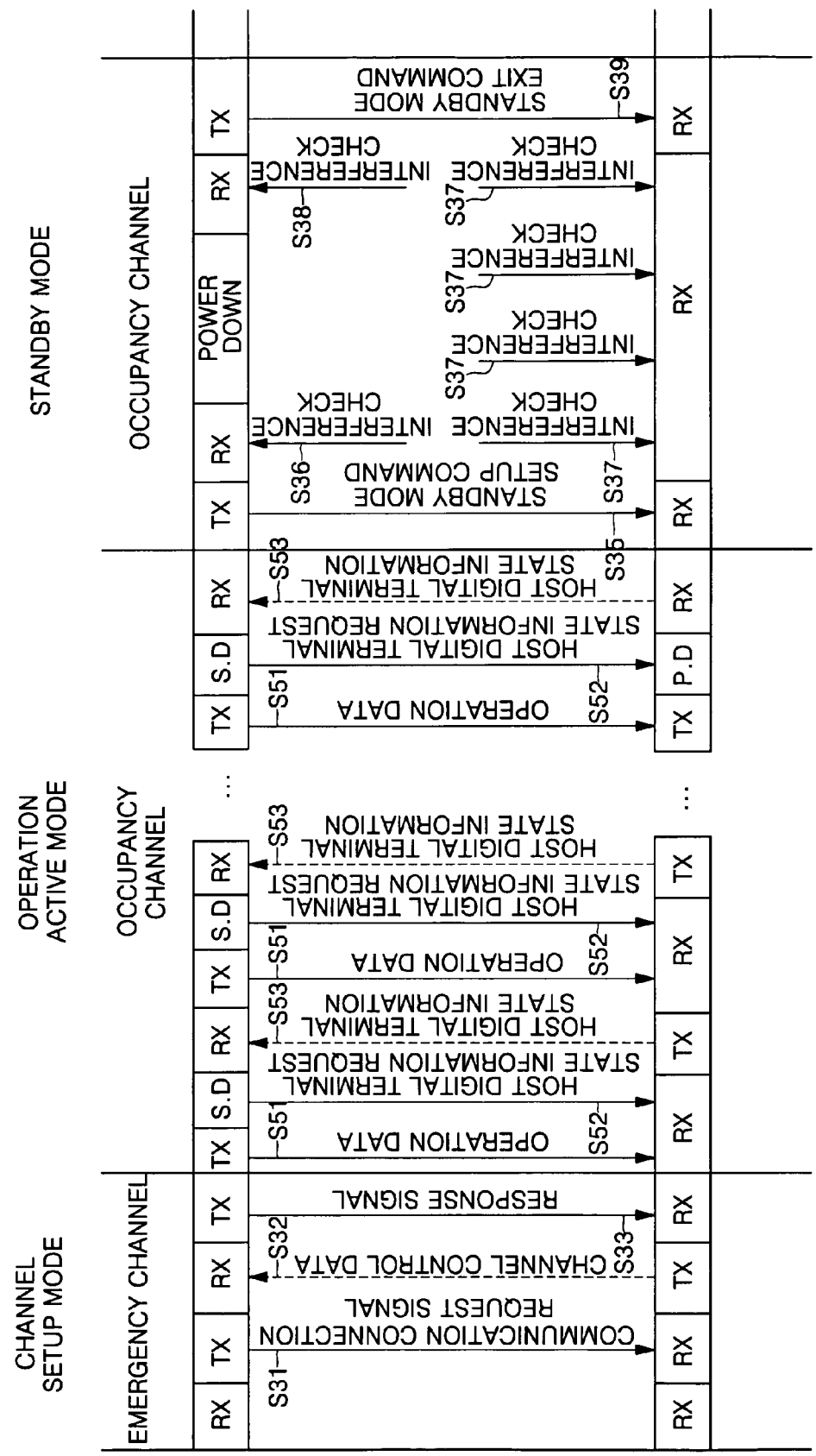
FIG. 8 is a diagram illustrating a wireless communication method of a human interface device according to a third exemplary embodiment of the present invention.

Meanwhile, when there is interference on the occupancy channel in the operation active mode, the present invention further provides the methods shown in FIGS. 7 and 8 in order to solve the problem.

FIG. 7 is a diagram illustrating a wireless communication method of a human interface according to a second exemplary embodiment of the present invention.

Figure 6:
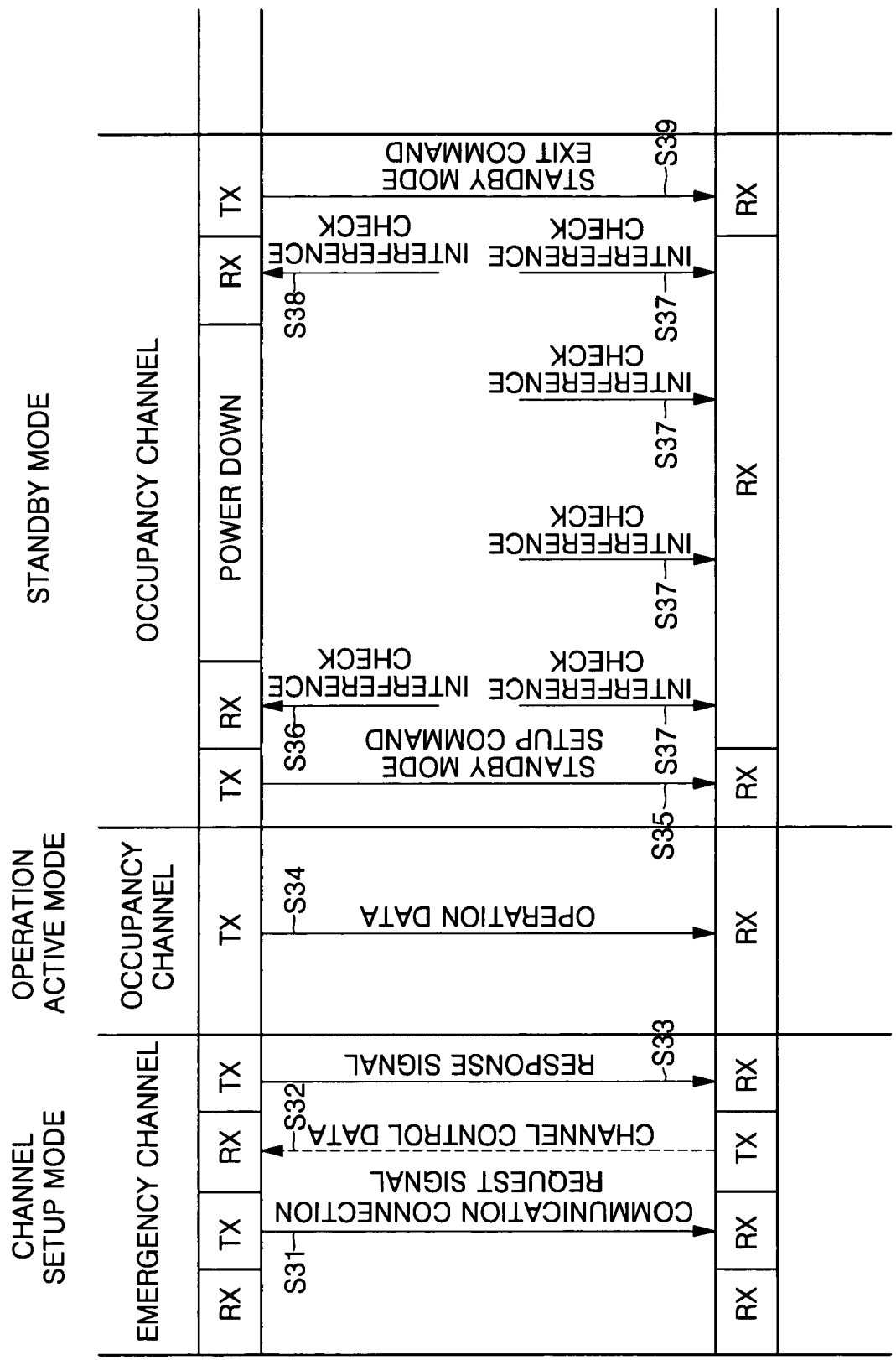
FIG. 6 is a diagram illustrating a wireless communication method of a human interface device according to a first exemplary embodiment of the present invention.

Here, since a communication method in the channel setup mode and operation active mode is the same as shown in FIG. 6, a detailed description thereof will be omitted.

Referring to FIG. 7, in the operation active mode, the wireless input unit 20 transmits the operation data to the host digital terminal 10 a predetermined number n times (S41), and then confirms whether erroneous data is received by operating the occupancy channel in the reception mode (S42).

Here, since it is recognized that there is interference on the occupancy channel when the erroneous data is received, the wireless input unit 20 enters into the channel setup mode and sets up the occupancy channel by wirelessly communicating with the host digital terminal 10.

Confirming that there is no interference on the occupancy channel, the wireless input unit 20 converts its mode to the transmission mode again and periodically repeats the operation of transmitting the operation data to the host digital terminal 10 in a predetermined number n times.

FIG. 8 is a diagram illustrating a wireless communication method of the human interface according to a third exemplary embodiment of the present invention.

Here, since a communication method in the channel setup mode and operation active mode is the same as shown in FIG. 6, a detailed description thereof will be omitted.

Referring to FIG. 8, in the operation active mode, the wireless input unit 20 transmits the operation data to the host digital terminal 10 in a predetermined number n times (S51), generates a signal to request state information of the host digital terminal, and transmits the signal on the occupancy channel (S52). Further, the wireless input unit switches the occupancy channel to the reception mode.

The host digital terminal 10 that has received the signal to request state information of the host digital terminal 10 from the wireless input unit 20 generates the state information of the host digital terminal having a predetermined code or information, and transmits the generated state information of the host digital terminal to the wireless input unit 20 by switching the occupancy channel to the transmission mode (S53).

When the wireless input unit 20 receives the state information from the host digital terminal 10 within a predetermined small interval it confirms that there is no interference on the occupancy channel, and periodically repeats steps of S51 to S53 to transmit the operation data performed n times to the host digital terminal 10 by switching the occupancy channel to the transmission mode again.

On the other hand, when the wireless input unit 20 does not receive the state information from the host digital terminal 10 within the predetermined interval, it determines that there is interference on the occupancy channel and enters into the channel setup mode.

Thus, according to the human interface and wireless communication method of the present invention, the time divisional bidirectional communication scheme is employed and data communication can be performed in the same frequency band so that frequency bandwidth is used more efficiently.

Further, data communication can be performed in the same frequency band so that a duplexer to separate transmitting frequency band and receiving frequency band can be eliminated and a device to modulate data on the transmission channel and a device to demodulate data on the reception channel can be easily integrated in one device. So, the cost and size of a product can be considerably reduced.

Further, when there is interference on the occupancy channel, information to set up the occupancy channel is communicated through the emergency channel, and the occupancy channel can be automatically set up so that operation reliability and efficiency of the human interface can be increased.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A wireless input unit of human interface device for communicating data with a host digital terminal, the wireless input unit comprising at least one emergency channel, one occupancy channel, and at least one unoccupied channel, transmission and reception channels of each channel using the same frequency band as employing a time divisional two-way communication scheme;

wherein the wireless input unit comprises an operation active mode for transmitting operation data generated by an internal operation of the wireless input unit through the occupancy channel, a standby mode for maintaining a lower power state than the operation active mode and sensing an interference on the occupancy channel, and a channel setup mode for communicating data used to set up the occupancy channel through the emergency channel and setting up the new occupancy channel;

wherein when there is no interference on the occupancy channel, the wireless input unit communicates the operation data with the host digital terminal through the occupancy channel, and when there is interference on the occupancy channel, the wireless input unit communicates data that includes substitute channel information to set up a new occupancy channel as the occupancy channel with the host digital terminal through the emergency channel; and wherein when the operation data is not generated in a predetermined time, the wireless input unit enters into the standby mode and sends a standby mode setup command setting up the standby mode to the host digital terminal through the occupancy channel.

2. The wireless input unit according to claim 1, wherein the wireless input unit includes: a wireless transceiver for communicating the data through the emergency channel in the channel setup mode, and the operation data through the occupancy channel in the operation active mode and the standby mode;

a transmission signal processor for, when the operation data is generated, setting up the operation active mode, encoding the operation data and transmitting the encoded data to the wireless transceiver, and setting up the standby mode when the operation data is not generated in the predetermined time;

a channel setup unit for, when receiving data used to set up the new occupancy channel in the channel setup mode, analyzing the data used to set up the new occupancy channel, obtaining substitute channel information, and setting up the substitute channel as the new occupancy channel;

and a receiving signal processor for, when receiving erroneous data on entering into the standby mode or on exiting the standby mode, sensing that there is interference on the occupancy channel and entering into the channel setup mode.

3. The wireless input unit according to claim 2, wherein the data used to set up the new occupancy channel includes the substitute channel information and unique ID information of the wireless input unit, and has a predetermined data format.

4. The wireless input unit according to claim 2, wherein the operation data includes unique ID information of the wireless input unit and has a predetermined data format.

5. The wireless input unit according to claim 2, wherein the erroneous data is any type of data that does not have the unique ID information of the wireless input unit or a predetermined data format, and is not recognized by the receiving signal processor.

6. The wireless input unit according to claim 2, wherein the channel setup unit further includes functions to generate a communication connection request signal to request a setup of the new occupancy channel when entering into the channel setup mode, and to generate a response signal when successfully receiving data used to set up a new occupancy channel.

7. The wireless input unit according to claim 2, wherein the transmission signal processor further includes functions to, when the wireless input unit enters into the standby mode, generate the standby mode setup command to inform that the wireless input unit enters into the standby mode, and when the wireless input unit exits the standby mode, generate a standby mode exit command to inform that the wireless input unit exits the standby mode.

8. The wireless input unit according to claim 1, wherein the wireless input unit further comprises a display unit, and when the channel setup is failed, the channel setup unit displays a failure of the channel setup.

9. A host digital terminal wirelessly connected to a wireless input unit of human interface device and connected via cable to a computer, for interfacing between the wireless input unit and the computer, the host digital terminal comprising at least one emergency channel, one occupancy channel, and at least one unoccupied channel, transmission and reception channels of each channel using the same frequency as employing a time divisional two-way communication scheme;

wherein the host digital terminal comprises an operation active mode for receiving operation data of the wireless input unit through the occupancy channel, an standby mode for maintaining a lower power state than the operation active mode and sensing an interference on the occupancy channel, and a channel setup mode for communicating data used to set up the occupancy channel through the emergency channel and setting up a new occupancy channel;

wherein when there is no interference on the occupancy channel, the host digital terminal communicates the operation data through the occupancy channel, and when there is interference on the occupancy channel, the host digital terminal obtains a substitute channel from among the at least one unoccupied channel, generates data including substitute channel information to set up a new occupancy channel as the occupancy channel, and communicates the data through the emergency channel; and wherein the host digital terminal enters into the standby mode by a standby mode setup command sent from the wireless input unit through the occupancy channel.

10. The host digital terminal according to claim 9, wherein the host digital terminal includes:

a wireless transceiver for communicating the data through the emergency channel in the channel setup mode, and receiving the operation data through the occupancy channel in the operation active and standby modes;

a channel setup unit for scanning the unoccupied channels and obtaining the substitute channel in the channel setup mode, and generating data to set up the new occupancy channel including the substitute channel information;

and a receiving signal processor for, when receiving the operation data, entering into the operation active mode, converting the operation data into a data format recognized by the computer and outputting the converted data format, and when receiving the erroneous data, confirming that there is interference on the occupancy channel and entering into the channel setup mode.

11. The host digital terminal according to claim 10, wherein the data used to set up the new occupancy channel includes the substitute channel information and an unique ID information of the wireless input unit, and has a predetermined data format.

12. The host digital terminal according to claim 10, wherein the operation data includes an unique ID information of the wireless input unit and has a predetermined data format.

13. The host digital terminal according to claim 10, wherein the erroneous data is any type of data that does not have the unique ID information of the wireless input unit or the predetermined data format, and is not recognized by the receiving signal processor.

14. The host digital terminal according to claim 10, wherein the receiving signal processor includes functions to enter into the standby mode when receiving data to inform that the host digital terminal enters into the standby mode from the wireless input unit, and to exit the standby mode when receiving data to inform that the host digital terminal exits the standby mode from the wireless input unit.

15. The host digital terminal according to claim 9, further comprising a display unit;

wherein when the channel setup is failed, the channel setup unit displays a failure of the channel setup on the display unit.

16. The host digital terminal according to claim 10, wherein when the channel setup is failed, the channel setup unit informs the computer that the channel setup has failed.

17. A wireless communication method in a wireless input unit of human interface device including at least one emergency channel, one occupancy channel, and at least one unoccupied channel, transmission and reception channels of each channel using the same frequency as employing a time divisional two-way communication scheme, the method comprising the steps of:

a) when receiving data that includes substitute channel information to set up a new occupancy channel as the occupancy channel through the emergency channel, analyzing the data to set up the new occupancy channel, obtaining the substitute channel, and setting up the substitute channel as the new occupancy channel;

b) transmitting operation data generated by an internal operation of the wireless input unit through the occupancy channel;

c) when the operation data is not generated before a predetermined time lapses, confirming whether there is interference on the occupancy channel and then enabling the wireless input unit to operate in a standby state when there is no interference on the occupancy channel, and enabling the wireless input unit to enter into the channel setup step when there is interference on the occupancy channel; and d) when the operation data is generated in the standby state, confirming whether there is interference on the occupancy channel, enabling the wireless input unit to enter into step b) when there is no interference on the occupancy channel, and enabling the wireless input unit to enter into step a) when there is interference on the occupancy channel, wherein the wireless input unit outputs a standby mode setup command setting up the standby state through the occupancy channel.

18. The wireless communication method according to claim 17, wherein the step a) includes the steps of: generating a communication connection request signal to request the occupancy channel setup and transmitting the communication connection request signal through the emergency channel;

and transmitting a response signal for the data to set up the new occupancy channel through the emergency channel, analyzing the data to set up the new occupancy channel and obtaining the substitute channel, and setting up the substitute channel as the new occupancy channel, when receiving the data to set up the occupancy channel through the emergency channel.

19. The wireless communication method according to claim 17, wherein the step c) includes the steps of: confirming whether erroneous data is received through the occupancy channel when the operation data is not generated until a predetermined time lapses;

confirming that there has occurred interference on the occupancy channel and enabling the wireless input unit to enter into the step a) when the erroneous data is received, and enabling the wireless input unit to operate in the standby state when the erroneous data is not received.

20. The wireless communication method according to claim 17, wherein the step d) includes the steps of:

confirming whether the erroneous data is received through the occupancy channel, when the operation data is generated in the standby state;

and confirming that there has occurred interference on the occupancy channel and enabling the wireless input unit to enter into the step a) when the erroneous data is received, and enabling the wireless input unit to enter into the step b) when the erroneous data is not received.

21. The wireless communication method according to claim 19, wherein the erroneous data is any type of data that does not have unique ID information of the wireless input unit or a predetermined data format, and is not recognized by a receiving signal processor.

22. The wireless communication method according to claim 17, wherein the step b) further comprises the step of sensing whether there is periodically interference on the occupancy channel.

23. The wireless communication method according to claim 17, wherein the step b) further comprises the steps of:

requesting information on the host digital terminal through the occupancy channel after transmitting the operation data through the occupancy channel predetermined times;

confirming that there has not been interference on the occupancy channel and transmitting the operation data through the occupancy channel again when the information on the host digital terminal is received through the occupancy channel within a predetermined time, and confirming that there has been interference on the occupancy channel and enabling the wireless input unit to enter into the step a) when the information on the host digital terminal is not received.

24. The wireless communication method according to claim 17, wherein the step a) further comprises the step of, when the occupancy channel setup is failed, informing that the occupancy channel setup has failed, through a predetermined display unit.

25. A wireless communication method in a host digital terminal of a computer including at least one emergency channel, one occupancy channel, and at least one unoccupied channel, transmission and reception channels of each channel using the same frequency as employing a time divisional two-way communication scheme, the method comprising the steps of:

a) scanning the one occupancy channel and the at least one unoccupied channel and obtaining a substitute channel, setting up the substitute channel as a new occupancy channel, generating data including information on the substitute channel to set up the new occupancy channel as the occupancy channel, and transmitting the data through the emergency channel;

b) when receiving operation data of a wireless input unit through the occupancy channel, converting the operation data into a format recognized by the computer, and transmitting the converted data to the computer;

c) when informed that the wireless input unit enters into an operation standby state by a standby mode setup command transmitted through the occupancy channel, enabling the wireless input unit to enter into the operation standby state and intermittently confirming whether there is interference on the occupancy channel, maintaining the operation standby state when there is no interference on the occupancy channel, and enabling the wireless input unit to enter into the step a) when there is interference on the occupancy channel; and d) when informed that the wireless input unit exits the operation standby state through the occupancy channel in the operation standby state, confirming whether there is interference on the occupancy channel, enabling the wireless input unit to enter into the step b) when there is no interference on the occupancy channel, and enabling the wireless input unit to enter into the step a) when there is interference on the occupancy channel.

26. The wireless communication method according to claim 25, wherein the step a) comprises the steps of:

obtaining a channel on which the data is not received by scanning the unoccupied channels, and storing information on the channel as information on the substitute channel;

generating data to set up the new occupancy channel including a unique ID of the wireless input unit and the information on the substitute channel, and transmitting the data to set up the occupancy channel on the emergency channel; and setting up the substitute channel as the occupancy channel when receiving a response signal for the data to set up the new occupancy channel from the wireless input unit.

27. The wireless communication method according to claim 25, wherein the step a) further comprises the step of re-entering into the step a) when the occupancy channel setup is failed or it is not confirmed whether the occupancy channel of the wireless input unit is set up.

28. The wireless communication method according to claim 25, wherein the step a) further comprises the step of informing that the occupancy channel setup is failed through a predetermined display unit, when the occupancy channel setup is failed.

29. The wireless communication method according to claim 25, wherein the step b) comprises the step of, when the wireless input unit requests information on the host digital terminal through the occupancy channel, sensing the request, obtaining information on the host digital terminal, and transmitting the information on the occupancy channel.

30. A wireless communication method in a human interface apparatus having a host digital terminal connected via cable to a computer and a wireless input unit including at least one emergency channel, one occupancy channel, and at least one unoccupied channel, transmission and reception channels of each channel using the same frequency as employing a time divisional two-way communication scheme, the method comprising the steps of:
   a) setting up an occupancy channel of the host digital terminal and the wireless input unit by communicating data including substitute channel information to set up a new occupancy channel as the occupancy channel through the emergency channel;
   b) transmitting, at the wireless input unit, operation data through the occupancy channel, and receiving, at the host digital terminal, the operation data; and
   c) when the operation data is not generated until a predetermined time lapses, enabling the wireless input unit and the host digital terminal to operate in an operation standby state, and confirming whether there is interference on the occupancy channel,
   wherein the host digital terminal enters into the operation standby state by receiving a standby mode setup command sent from the wireless input unit through the occupancy channel.

31. The wireless communication method according to claim 30, wherein the step a) comprises the steps of: generating, at the wireless input unit, a communication connection request signal to request the occupancy channel setup and transmitting the communication connection request signal through the emergency channel;
   scanning the at least one unoccupied channel and obtaining a substitute channel, and generating channel control data including a unique ID of the wireless input unit and information on the substitute channel and transmitting the channel control data on the emergency channel, when the host digital terminal receives the data to set up the new occupancy channel through the emergency channel;
   transmitting the response signal on the emergency channel, and setting up the new occupancy channel when the wireless input unit receives the channel control data, generating a response signal; and setting up the substitute channel as the new occupancy channel when receiving a response signal for the channel control data from the wireless input unit.

32. The wireless communication method according to claim 30, wherein the step a) further comprises the step of scanning, at the host digital terminal, the at least one unoccupied channel intermittently or periodically, and updating the substitute channel information.

33. The wireless communication method according to claim 30, wherein the step a) is performed by newly installing and initializing the wireless input unit or the host digital terminal.

34. The wireless communication method according to claim 30, wherein the step b) further comprises the step of, at the wireless input unit, sensing whether there is interference on the occupancy channel.

35. The wireless communication method according to claim 30, wherein the step b) further comprises the steps of: requesting information on the host digital terminal through the occupancy channel after the wireless input unit transmits the operation data through the occupancy channel in a predetermined number times;
   obtaining the information on the host digital terminal and transmitting the information on the occupancy channel when the host digital terminal detects that the wireless input unit requests the information on the host digital terminal through the occupancy channel; and confirming that there has not occurred interference on the occupancy channel and transmitting the operation data again through the occupancy channel when the wireless input unit receives the information on the host digital terminal through the occupancy channel within the predetermined number times, and confirming that there has occurred interference on the occupancy channel and enabling the wireless input unit to enter into the step a) when the wireless input unit does not receive the information on the host digital terminal through the occupancy channel within the predetermined number times.

36. The wireless communication method according to claim 30, wherein the step c) comprises the steps of:
   informing that the wireless input unit enters into the standby mode on the occupancy channel, and at the same time confirming whether there is interference on the occupancy channel, when the wireless input unit does not generate operation data until a predetermined time lapses;
   enabling the host digital terminal to operate in the standby mode and confirming whether there is interference on the occupancy channel intermittently when it is informed that the wireless input unit enters into the standby mode through the occupancy channel;
   exiting, at the wireless input unit, the standby mode on the occupancy channel, and at the same time confirming whether there is interference on the occupancy channel when the operation data is generated; and
   exiting, at the host digital terminal, the standby mode when it is informed that the wireless input unit exits the standby mode through the occupancy channel.

37. The wireless communication method according to claim 30, wherein the step c) comprises the step of, when the wireless input unit enters into the standby mode or exits the standby mode, confirming whether there is interference on the occupancy channel.

38. The wireless communication method according to claim 30, wherein the step a) further comprises the step of, when the occupancy channel setup is failed, informing, at the wireless input unit and the host digital terminal, that the occupancy channel setup is failed through a predetermined display unit.

39. The wireless communication method according to claim 30, wherein the step a) further comprises the step of, when the occupancy channel setup is failed, informing, at the host digital terminal, a computer that the occupancy channel setup is failed.

40. The wireless communication method according to claim 20, wherein the erroneous data is any type of data that does not have unique ID information of the wireless input unit or a predetermined data format, and is not recognized by a receiving signal processor.

* * * * *